United States Patent
Biehlmann

(10) Patent No.: US 11,004,286 B2
(45) Date of Patent: May 11, 2021

(54) SELF-DIRECTED ACCESS CARD ISSUANCE SYSTEM

(71) Applicant: Entrust Datacard Corporation, Shakopee, MN (US)

(72) Inventor: Christophe Biehlmann, Prior Lake, MN (US)

(73) Assignee: Entrust Datacard Corporation, Shakopee, MN (US)

(*) Notice: Subject to any disclaimer, the term of this patent is extended or adjusted under 35 U.S.C. 154(b) by 25 days.

(21) Appl. No.: 16/381,616

(22) Filed: Apr. 11, 2019

(65) Prior Publication Data

US 2019/0318558 A1  Oct. 17, 2019

Related U.S. Application Data

(60) Provisional application No. 62/656,211, filed on Apr. 11, 2018.

(51) Int. Cl.
  *G07C 9/27* (2020.01)
  *G06F 21/45* (2013.01)
  (Continued)

(52) U.S. Cl.
  CPC ............. *G07C 9/27* (2020.01); *B42D 25/485* (2014.10); *G06F 21/45* (2013.01); *G07C 9/22* (2020.01)

(58) Field of Classification Search
  CPC .. G07C 9/27; G07C 9/22; G06F 21/45; B42D 25/485
  (Continued)

(56) References Cited

U.S. PATENT DOCUMENTS

2004/0158740 A1* 8/2004 Lien .................... G07C 9/22
                                                                40/625
2010/0123002 A1* 5/2010 Caporicci ............ G06Q 20/355
                                                                235/380
(Continued)

FOREIGN PATENT DOCUMENTS

KR    10-2016-0104610 A    9/2016
WO    2012/151486 A2    11/2012

OTHER PUBLICATIONS

International Search Report and Written Opinion for Application No. PCT/US2019/026948 dated Jul. 29, 2019.
(Continued)

*Primary Examiner* — Paultep Savusdiphol
(74) *Attorney, Agent, or Firm* — Merchant & Gould P.C.

(57) ABSTRACT

An access card issuance system comprising an access card issuance device located at a facility of an organization and a web server is disclosed. The access card issuance system provides a web interface in response to a request from a mobile device, and receives user information identifying a user of the mobile device. The system is also configured to validate the identity of an authorized individual associated with the facility identified by a user of the mobile device, and issue an access card to the user of the mobile device. The access card has indicia printed thereon identifying at least a portion of the user information, and programmable information encoded onto the access card providing access rights to the facility. The system further transmits, to the authorized individual, a message associated with issuance of the access card.

24 Claims, 17 Drawing Sheets

(51) Int. Cl.
    *B42D 25/485*     (2014.01)
    *G07C 9/22*       (2020.01)
(58) Field of Classification Search
    USPC .................................................. 235/382, 380
    See application file for complete search history.

(56) References Cited

U.S. PATENT DOCUMENTS

| | | |
|---|---|---|
| 2012/0197718 A1 | 8/2012 | Martchenko et al. |
| 2013/0215467 A1* | 8/2013 | Fein ...................... G06F 3/1285 |
| | | 358/1.15 |
| 2015/0288835 A1* | 10/2015 | Fein ...................... G06F 3/1292 |
| | | 358/1.15 |

OTHER PUBLICATIONS

Veristream—Top 6 Most-Valuable Features of Visitor Management Systems (Blog Post); www.veristream.com, Posted Oct. 18, 2016—6 Pages.
Veristream—Enterprise Visitor Management ID Badges—Where to Wear (Blog Post); www.veristream.com, Posted May 16, 2016—7 Pages.

\* cited by examiner

SELF-DIRECTED ACCESS CARD ISSUANCE SYSTEM

CROSS-REFERENCE TO RELATED APPLICATIONS

This application claims priority to U.S. Provisional Application Ser. No. 62/656,211, filed Apr. 11, 2018 and entitled "Self-Directed Access Card Issuance System," the disclosure of which is incorporated herein by reference in its entirety.

BACKGROUND

Many companies have chosen to require that visitors to company facilities are issued a "visitor badge" each time that visitor enters the company's premises. Issuance of a badge generally requires a process in which a user provides information to a company representative, including their name, their host's name, and a signature indicating a time of arrival, as well as (possibly) a photograph that will be included on that visitor's badge. The company representative will then use a computer having specialized software installed thereon to format the visitor badge. The formatted visitor badge information is provided to a printing device, which in turn prints the visitor badge. The visitor badge is typically an access card having identifying information for the visitor printed thereon, as well as encoded information included on the access card (e.g., in a programmable or fixed encoded chip) that grants the visitor access rights to at least a portion of a facility.

This arrangement has a number of drawbacks. For example, in many instances, companies may have facilities with unattended entrance points, and therefore may not have a company representative present to assist in creating a visitor badge. In these instances, the company may place a "self-service" visitor badge issuance station at the entrance; however, even in these circumstances, the company must include at the entrance a specially-configured computing system having software and/or drivers installed thereon which are capable of capturing the required information and interfacing with a badge printer, a capturing and a printing device, as well as software and/or drivers installed on computers to drive those devices. Depending on the software, a corporate employee may be required to call/notify the host that a guest arrived.

SUMMARY

The present disclosure relates generally to methods and systems for self-directed access card issuance. In some instances, a visitor or facility-authorized individual may be presented with a user interface at which user information can be captured. Upon validation of an authorized individual associated with the facility (e.g., a contact of the visitor or the facility-authorized individual themselves), an access card can be printed.

In a first aspect, an access card printer includes a card printing subsystem, a processing unit, and a memory communicatively connected to the processing unit. The memory stores instructions executable by the processing unit including a card printing application wherein the instructions, when executed, cause the access card printer to, in response to a request from a mobile device: provide a web interface to the mobile device; receive, via the web interface, user information identifying a user of the mobile device, the user information including an identity of an authorized individual associated with a facility; optionally validate the identity of the authorized individual associated with the facility; and issue an access card to the user of the mobile device, the access card having indicia printed thereon by the card printing subsystem identifying the user (e.g., an image of the user), and optionally, programmable information encoded onto the access card providing access rights to the facility. The device is further configured to transmit, to the authorized individual, a message associated with issuance of the access card.

In a second aspect, a method of issuing an access card at a facility is disclosed. The method includes providing a web interface to a mobile device, and receiving, via the web interface, user information identifying a user of the mobile device, the user information including an identity of an authorized individual associated with the facility. The method includes optionally validating the identity of the authorized individual associated with the facility, and issuing, at an access card issuance device, an access card to the user of the mobile device, including printing indicia on the access card including at least a portion of the user information and, optionally, registering information encoded onto the access card one or more access rights to the facility for the user. The method includes transmitting, from the access card issuance device to the authorized individual, a message associated with issuance of the access card.

In a third aspect, an access card issuance system comprising an access card issuance device located at a facility of an organization and a web server is disclosed. The access card issuance system is configured to provide a web interface from the web server to a mobile device in response to a request from the mobile device, and receive, via the web interface, user information identifying a user of the mobile device, the user information including an identity of an authorized individual associated with a facility. The system is further configured to optionally validate the identity of the authorized individual associated with the facility, and issue an access card to the user of the mobile device from the access card issuance device, the access card having indicia printed thereon identifying at least a portion of the user information, and, optionally, programmable information encoded onto the access card providing access rights to the facility. The system is also configured to transmit, to the authorized individual, a message associated with issuance of the access card.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
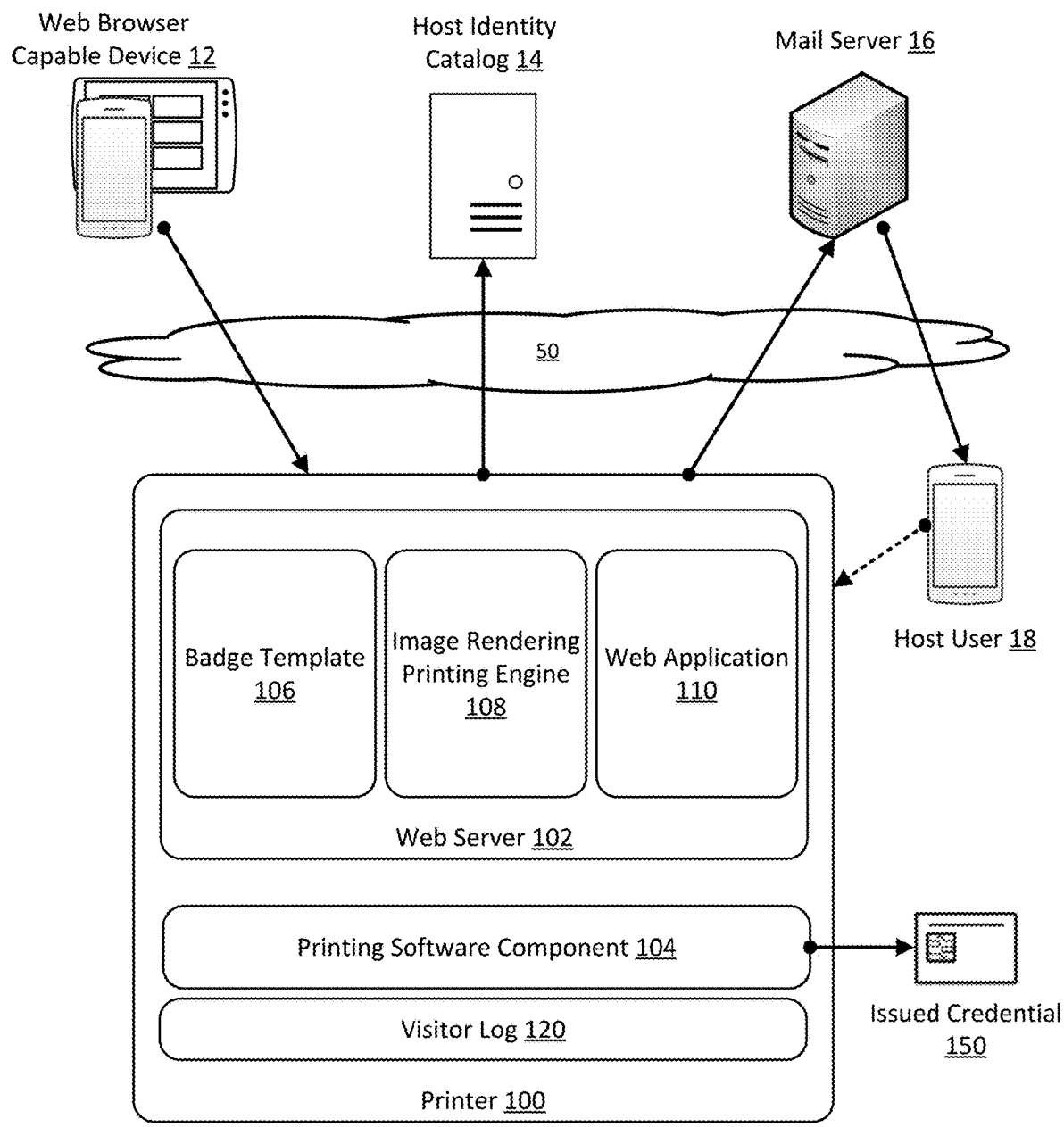
FIG. 1 illustrates a network within which aspects of the present disclosure can be implemented, including an access card issuance device useable according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to methods and systems for self-directed access card issuance. In some instances, a visitor or facility-authorized individual may be presented with a user interface at which user information can be captured. Upon validation of an authorized individual associated with the facility (e.g., a contact of the visitor or the facility-authorized individual themselves), an access card can be printed. In other instances, an authorized user may, using his/her own mobile device, reissue themselves an access card in the event their existing access card is lost/stolen. In such instances, the authorized user can validate him/herself prior to access card issuance.

In accordance with the various embodiments discussed below, it is noted that the methods and systems described herein have a number of advantages over existing systems. For example, such systems are capable of generating visitor log entries automatically in association with card issuance, and therefore reduce the need for trained security personnel to be present at facility entrances. Furthermore, because each card issuance is tied to an authorized individual at that facility and that authorized individual can be automatically notified of the presence of his/her visitor, the need for trained security personnel is still further reduced. Furthermore, because notifications to an authorized individual can include captured photographs of the visitor, the authorized individuals can visually verify that the visitor is the correct person prior to greeting the visitor. Additionally, because the methods and systems described herein (1) leverage the capabilities of a mobile device of the user, and (2) are presented in a web interface, there is both a reduce need for expensive hardware (e.g., image and/or signature capturing devices) at the facility entrance, or installation of specific application software on an uncontrolled (e.g., visitor's) mobile device. Since visitors may be one-time or rare visitors to a facility, those visitors may not wish to install rarely-used applications on their personal devices. Still further, because the badge printer either manages or is communicatively connected with a system that manages the web interface, the printer is not required to re-authenticate the visitor during that same visit, but prior to issuance of the visitor badge.

Referring now to FIG. 1, a network 10 is shown, within which aspects of the present disclosure can be implemented. The network 10 includes an access card issuance device, shown as printer 100. The printer 100 is generally configured to issue credentials, such as credential 150, to users. The credential is typically generated by a printing software component 104 of the printer 100, and typically includes printed indicia thereon. This information can include, for example, one or more of a user name, a picture, a signature, a duration of validity of the badge; an access level associated with the badge, a name of a host of the user, or other information associated with the user visit. The credential 150 can typically also include an electronic chip, which can be authorized at the time of printing to grant access rights to a facility to a holder of the credential 150. This could include programming access rights onto the credential 150, or assigning a fixed identifier (e.g., code) included in the credential (e.g., an RFID code) with access rights in a facility database to allow the credential holder facility access.

In the embodiment shown, the printer 100 includes a web server 102 included thereon. The web server 102 includes a badge template 106, an image rendering printing engine 108, and a web application 110, use and operation of which are described below. Generally, the web server 102 provides an interface between the printing software component 104 and one or more other devices, such as devices the printer 100 may be communicatively connected to via either short-range wireless communication or via a company network, or via the Internet, and also provides user interfaces to remote systems that issue requests to the printer 100.

In the embodiment shown, the printer 100 is communicatively connected to a web browser capable device 12, a host identity catalog 14, a mail server 16, and optionally a host user 18, via network infrastructure 50 (e.g., a corporate wireless network, public/cellular network, or some combination thereof).

Typically, the web browser capable device 12 corresponds to a mobile device of a user. The user may be, for example, a visitor to a facility, or an authorized user at the facility seeking reissuance of a credential 150. The web browser capable device 12 generally has a user interface including a web browser, as well as an image capture device (e.g., a camera). In typical scenarios, the web browser capable device is a mobile touchscreen device having a camera and one or more of a 802.11 (Wi-Fi) or cellular connection.

The host identity catalog 14 stores contact information and details regarding authorized individuals at the facility. The host identity catalog can be, for example, a corporate directory, in the instance the facility is associated with a corporation. However, in alternative implementations, the host identity catalog 14 can be any identity provider, such as an authenticating website (e.g., Google, Facebook) which authenticates user identities, or other types of host identity repositories (e.g., an organizational directory). For example, the host identity catalog 14 can include name, location, preferred contact information, and optionally second contact information of each of the authorized individuals at the facility. Authorized individuals can include any individuals having authorization to access the facility, or authorization to host visitors at the facility. Authorized individuals can include, for example, employees of a company operating the facility. In some embodiments in which the host identity catalog 14 comprises a corporate directory, the corporate directory can be implemented using Active Directory software from Microsoft Corporation of Redmond, Wash. Other corporate directory software can be used as well. Generally, any LDAP/Active Directory arrangement would be suitable.

The mail server 16 manages communications with authorized individuals. For example, the mail server 16 can manage transmission of email, text, or automated voicemail messages to authorized individuals. In example embodiments, the mail server can correspond to a corporate mail server, for example implementing Microsoft Exchange Server software from Microsoft Corporation of Redmond, Wash. Other types of corporate mail servers or other mail server devices (e.g., cloud-based mail servers, etc.) can be used as well.

The host user 18 generally corresponds to a desktop or mobile device associated with an authorized individual at the facility. Typically, as discussed in the use cases herein, the host user 18 represents a computing device of an authorized individual identified by a visitor during the methods for self-directed card issuance described herein.

Referring back to the printer 100, and the web server 102 specifically, the web server 102 can be implemented in memory of the printer 100, and will store instructions useable to (1) interface with visitors and authorized users, (2) form access cards (e.g., badges, represented by credential 150) from captured information in a predetermined format, and (3) communicate with servers and devices within an organization to validate the visitor or authorized individual, to ensure that credentials 150 are only issued to those users who are expected or allowed to be present. To that end, the badge template 106 of the web server 102 will store one or more badge templates, which includes a physical layout of printed indicia to be included on the physical credential when issued. The badge template can include a set of required information (e.g., name, image of the user, optionally a visitor or employee identification number) as well as information about how to associate the credential 150 with access rights (e.g., specific programming to be included on the credential 150, or a method by which a code on the access card can be granted access by associating that code with access rights in a security database (not shown)). An image rendering and printing engine 108 can be included in the web server 102, and will receive image data captured by the web browser capable device from the web application 110 for rendering in the printed indicia on the credential, e.g., as defined in a particular badge template 106.

The web application 110 generates and provides a web interface including a plurality of user screens that guide a user through self-issuance of an access card (e.g., credential 150). The web application 110 is instantiated at startup of the web server 102 (e.g., at startup of the printer 100 in the example of FIG. 1). In the embodiment of FIG. 1, in addition to all services requires to operate/print, the printer starts a web server 102 as an application which makes available to any web client-capable application (i.e., a Web Browser) a customizable web application 110, which is implemented, in some embodiments, as a set of HTML pages and associated JavaScript. In some embodiments, the web application 110 is stored in memory of the printer; in alternative embodiments, the web application 110 is downloaded, after the web server 102 is started, from a predefined location that is known to the printer 100. Notably, no other specific software applications are required on either the printer 100 or on other devices, e.g., the web browser capable device 12.

In the embodiment shown, the web application 110 can host the web interface at a predetermined web address, e.g., within a company's inter- or intra-net. In some embodiments, user devices that connect to a company's wireless network at a facility can be redirected to a user screen that allows the user to initiate the credential issuance process. In other embodiments, a user may be directed to navigate in a web browser to a particular website. In still other embodiments, a user may obtain a uniform resource locator (URL) of the website by other means, such as by reading an NFC tag included at the printer 100, which can then be used by a web browser of the web browser capable device 12 to access the website hosted by web application. In example embodiments, the web application can generate screens and guide a user through a process for self-directed issuance of an access card as are shown in FIGS. 4-16.

Figure 2:
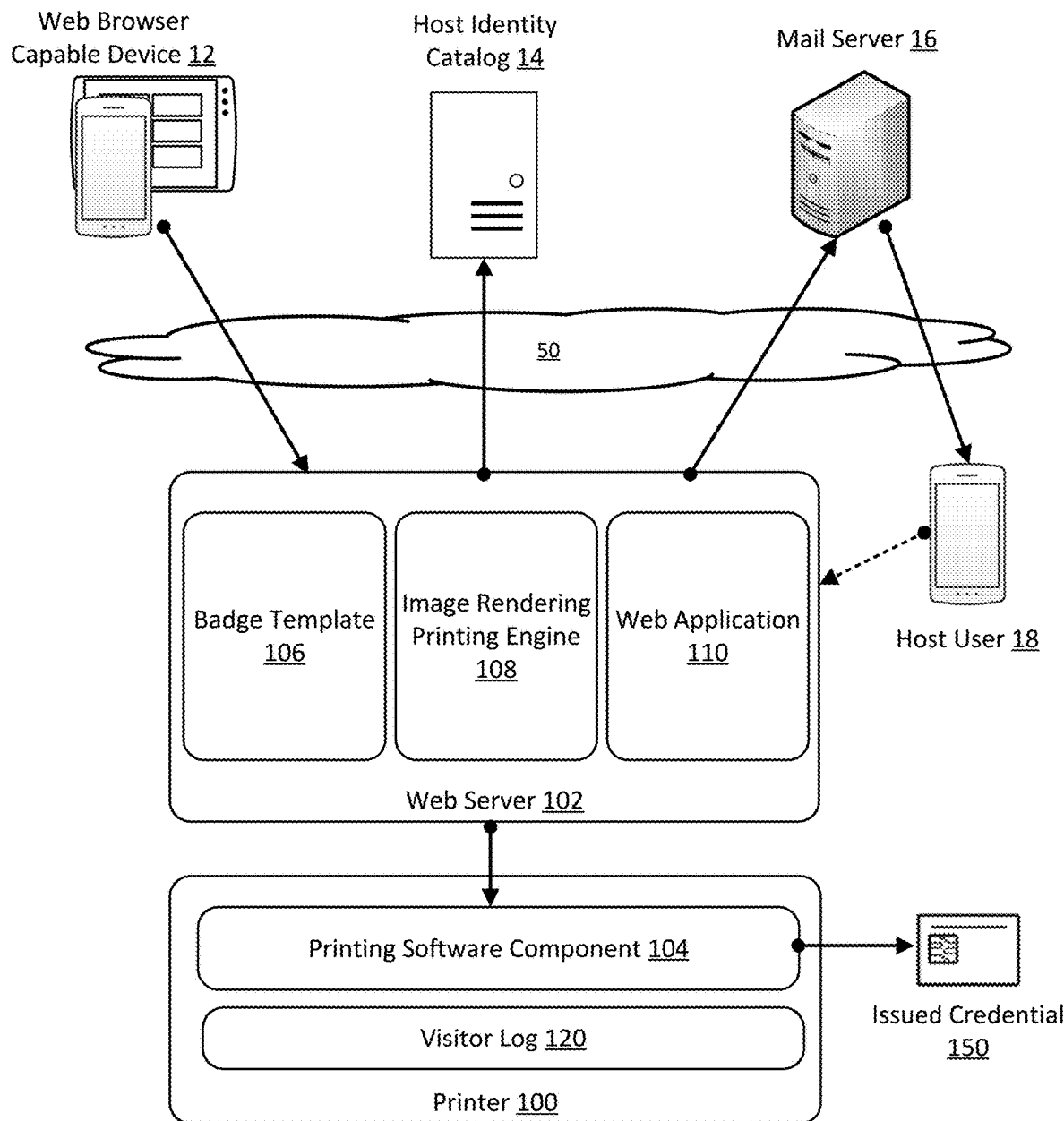
FIG. 2 illustrates a network within which aspects of the present disclosure can be implemented, including an access card issuance device useable according to a second example embodiment.

FIG. 2 illustrates a network 200 within which aspects of the present disclosure can be implemented, including an access card issuance device useable according to a second example embodiment. The network 200 generally corresponds to network 10 of FIG. 1; however, as illustrated, the web server 102 can be a device separate from the printer 100 and communicatively connected to the printer. As such, the web server 200 need not necessarily be present at the facility, and need not be integrated into the printer 100, thereby avoiding a requirement that the printer 100 have substantial computing capabilities, and allowing the printer 100 to be a lower-cost device.

Referring to FIGS. 1-2 generally, it is noted that operation of both networks 200 can be analogous. Once the web interface presented by the web application 110 is used by a user of the web browser capable device 12 to capture user information, the web server 102 can provide that information, in a format defined by the badge template 106, to a printing software component 104, which can issue a credential 150. It is noted that the credential can be a credential for a visitor user, or optionally, a reissued credential for an authorized individual at the facility (e.g., in the case of a lost or stolen credential). In some cases (e.g., at least in the cases of visitor credential issuance) once the credential is issued, at least a portion of the user information can be stored in a visitor log 120. This can include, for example, the user name of the visiting user, the name of an authorized individual, or host, of the visiting user, an image of the visiting user, a signature of the visiting user captured at the web browser capable device 12, and a timestamp associated with issuance of the credential. It is noted that in example embodiments, the visitor log 120 can store user name and other logged information in an encrypted format to preserve security.

Furthermore, during the credential issuance process, the web server 102 can initiate communication with an authorized individual. This can occur in a number of circumstances. In the case of a visiting user, the authorized individual can represent a host of that visiting user, and therefore the web server 102 will, based on contact information of the authorized individual registered in the host identity catalog 14, initiate communication with the authorized individual, either via mail server 16 or directly to host user 18. This communication can be, for example, an email, text message, or automated voice message indicating to the authorized individual that his/her visitor has arrived, and optionally, that the visiting user has completed the access card issuance process. In cases where an email or text message is provided, the message can include an image of the visiting user, so the authorized individual can readily identify the visiting user as the correct person. Furthermore, the message can be provided to the authorized individual either before or after the credential 150 is actually issued by the printer.

Alternatively, in cases where the user is also the authorized user (e.g., in the case of credential reissuance), the message to the authorized user can be used for two-factor authentication of that user prior to issuance. For example, the message can be a text message including an authorization code that may be a required entry in the web interface for validation that the user of the web browser capable device 12 is in fact the authorized user, e.g., by sending the authorization code to the phone number of the authorized user listed in the host identity catalog 14.

Still referring to FIGS. 1-2 generally, it is noted that a number of components of networks 10, 200 may be at locations other than at the particular facility for which access is sought. For example, generally, the printer 100 and the web browser capable device 12 will be at the facility, since the user seeking a credential 150 will have possession of the web browser capable device 12, and the printer 100 will be present in order to issue the credential. Additionally, preferably (assuming the authorize user is also present at the facility), the host user device 18 may also be at the facility. However, the host identity catalog 14 and mail server 16 may be at some other facility managed by the company associated with the facility, and in some instances (such as in the embodiment of FIG. 2), the web server 102 may also be remote from the facility. Still other possible configurations of components are apparent from the discussion above and are contemplated by the present disclosure.

Figure 3:
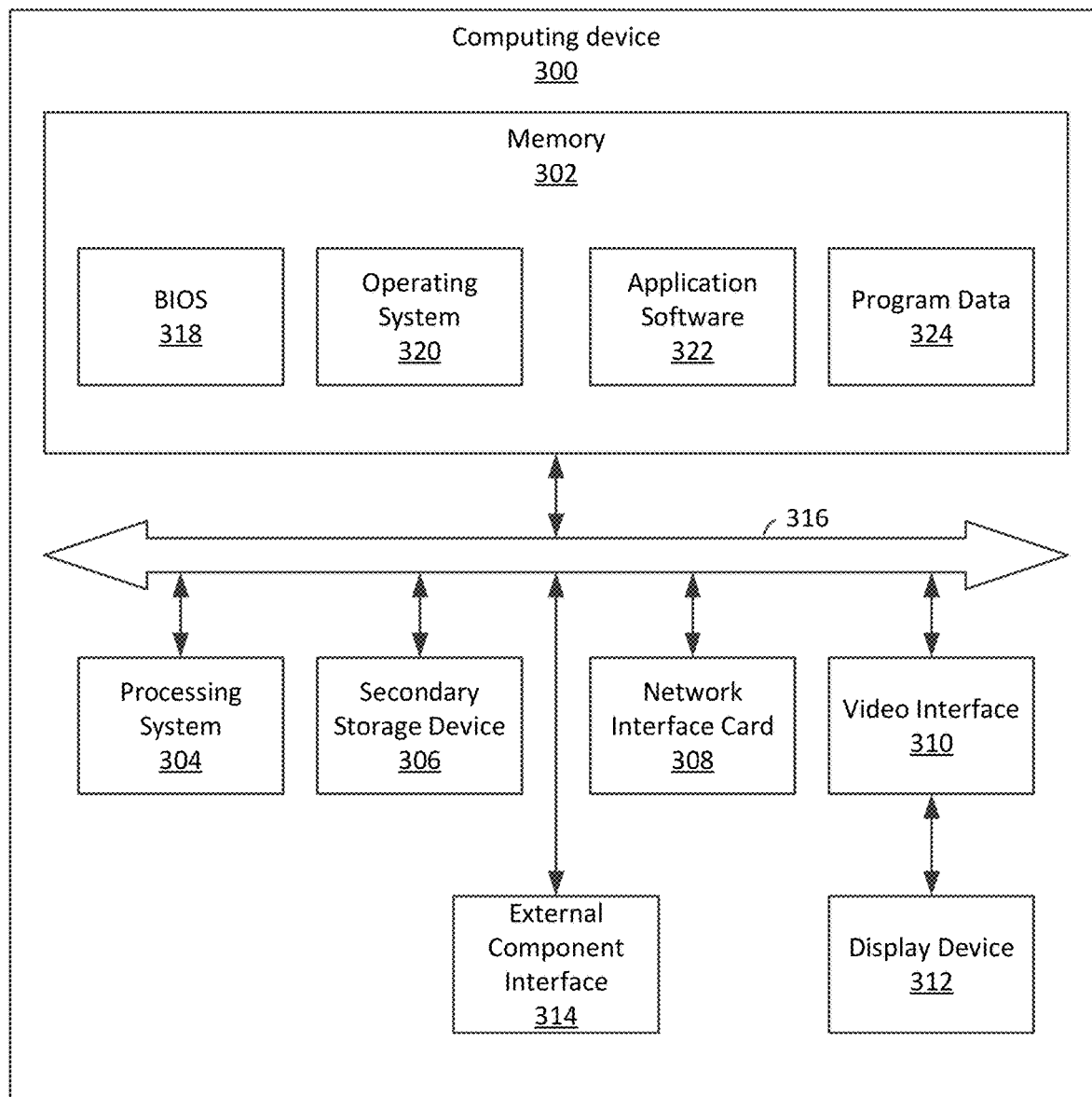
FIG. 3 illustrates an example computing device useable to implement aspects of the present disclosure.

Referring now to FIG. 3, a computing device 300 is shown, with which aspects of the present disclosure can be implemented. The computing device 300 can be used, for example, to implement a printer 100, web server 102, or any of devices 12-18 as described above in connection with FIGS. 1-2.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media, and generally includes at least some tangible media. In some embodiments, the memory 302 is implemented using entirely non-transitory media.

The processing system 304 includes one or more processing units, or programmable circuits. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid-state memory devices, and/or other types of tangible computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. The communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. The memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

For example, if printer 100 is implemented, an additional card printing subsystem may be included in such a device 300, for issuance of credentials 150, as well as the software discussed above in connection with FIGS. 1-2. Additionally, in the case of the web browser capable device 12, certain application software (e.g., a web browser) and hardware devices (e.g., a touch-screen user interface, optionally a wireless identification chip such as an NFC or RFID reader) may be included as well.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 300 of FIG. 3, the computer-readable instructions are stored on devices that include non-transitory media. In particular embodiments, the computer-readable instructions are stored on entirely non-transitory media.

Figure 4:
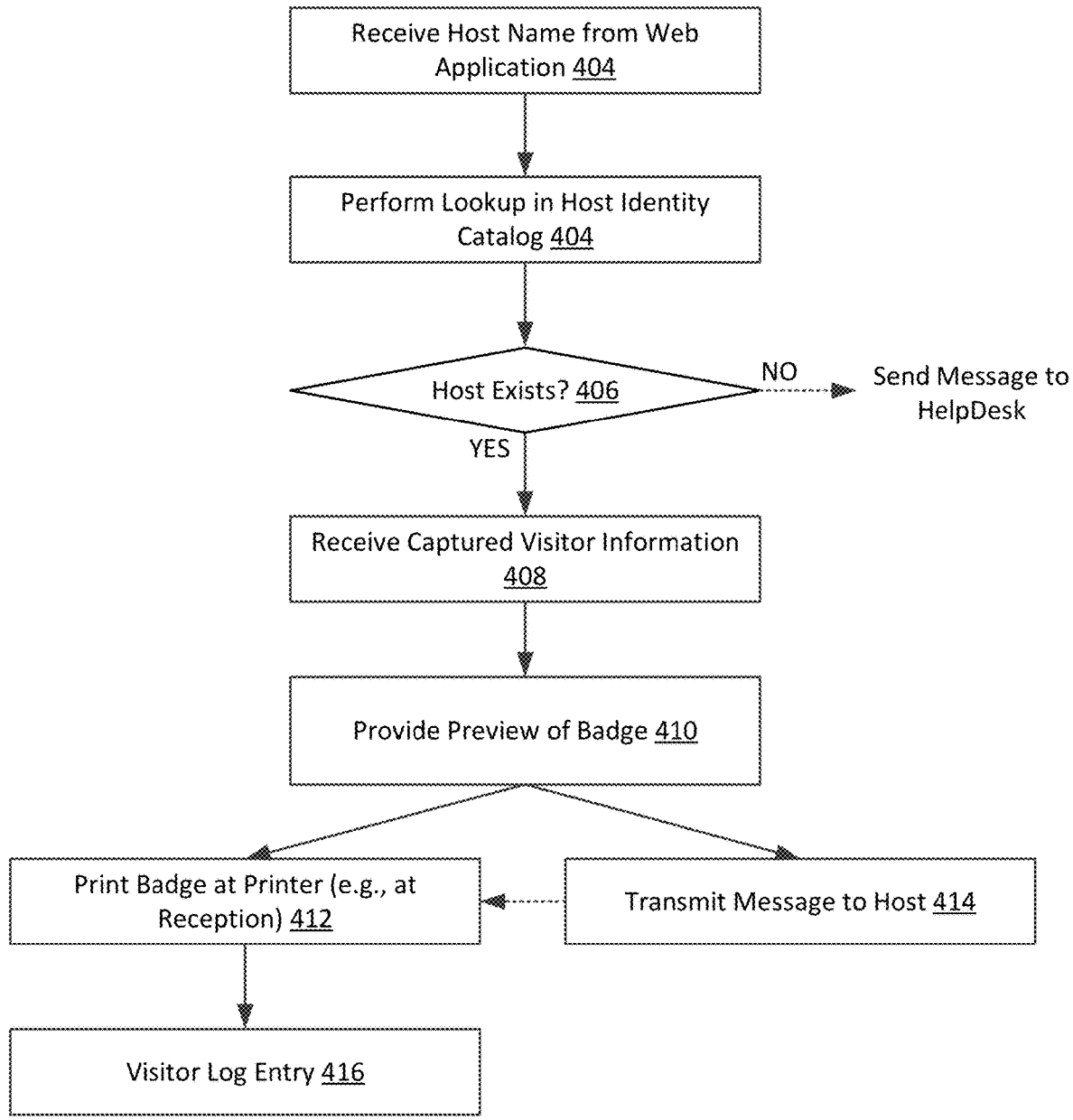
FIG. 4 is a flowchart of a method for issuing a visitor access card at a facility via an access card issuance device, according to an example embodiment.
Figure 5:
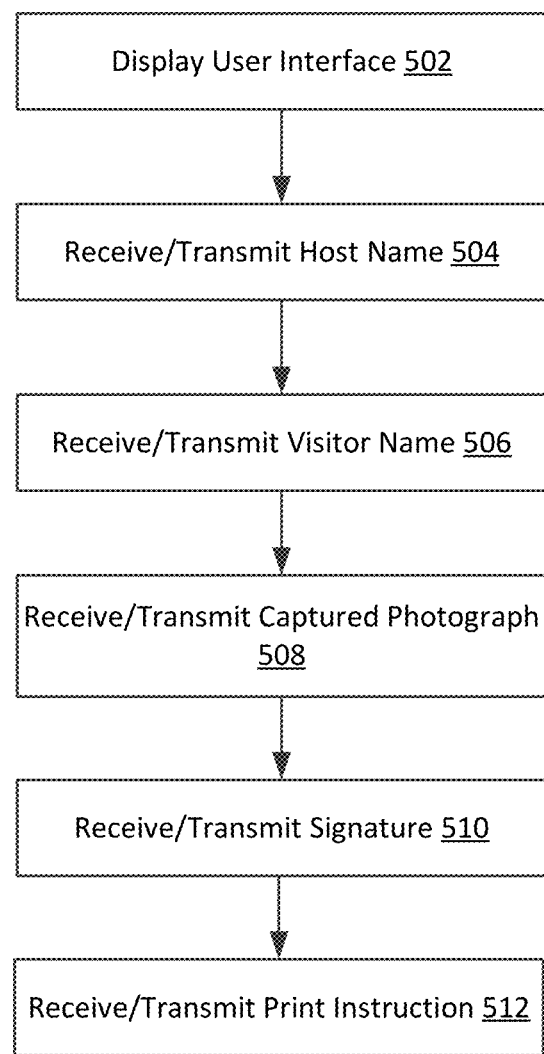
FIG. 5 is a flowchart of a method for capturing visitor information at a mobile device, for use by an access card issuance device, according to an example embodiment.
Figure 6:
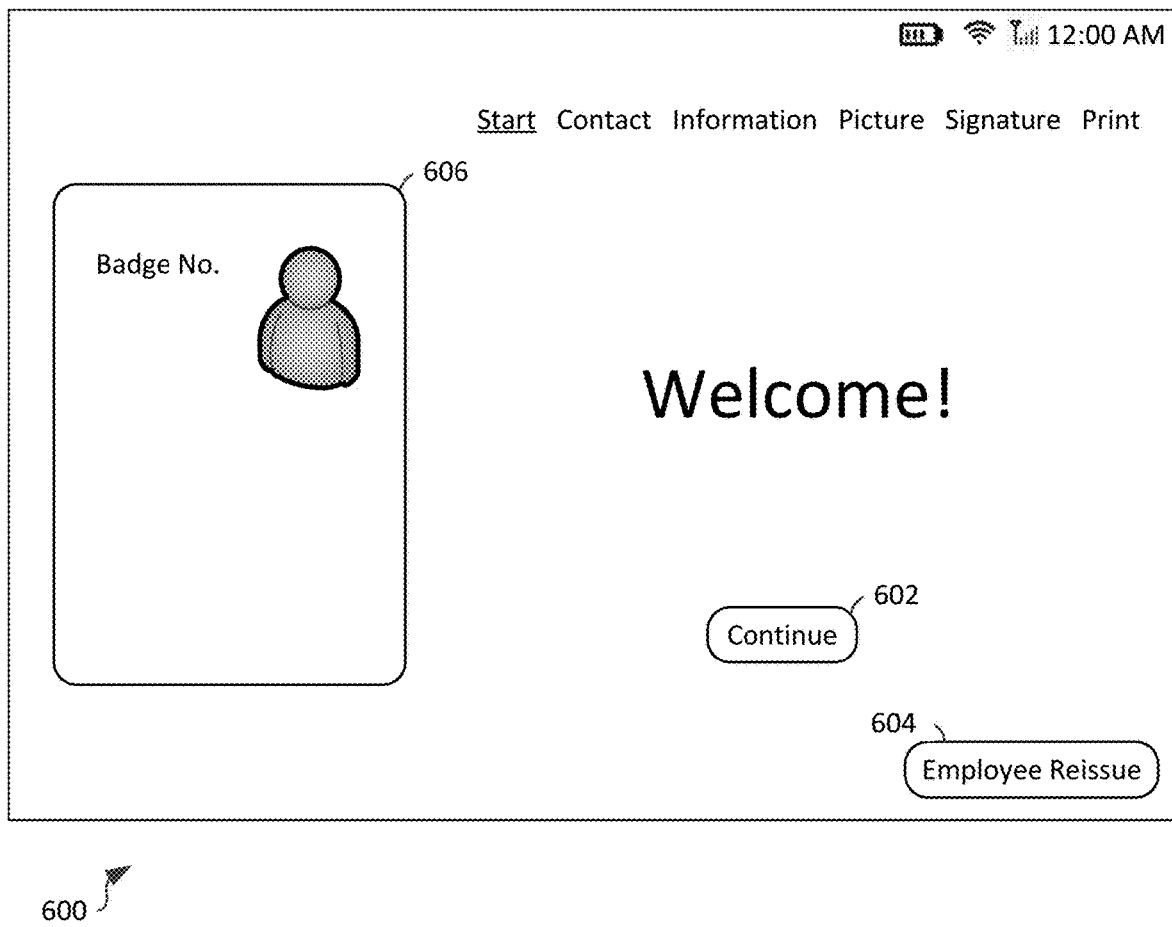
FIG. 6 is a web interface useable by a visitor to provide user information to an access card issuance device, according to an example embodiment.

Referring now to FIGS. 4-5, flowcharts of methods for issuing a visitor access card at a facility are shown. FIG. 4 illustrates a method capable of being performed by a printer and/or web server, such as the printer 100 and web server 102 of FIGS. 1-2. FIG. 5 illustrates a method capable of being performed at the web browser capable device 12, based on screens generated and provided to such a device by the web server 102, and particularly the web application 110.

Referring specifically to FIG. 4, the method 400 is initiated by the web browser enabled device, once that device is directed to an appropriate web address for screens hosted by the web server 102. The web server 102 receives a host name from the web application 110 (which collects that information via screens discussed below in connection with FIGS. 6-11) (step 402). The web server performs a lookup in a host identity catalog, such as host identity catalog 14 of FIGS. 1-2 (step 404).

In the embodiment shown, a determination is made as to whether the authorized user identified by the host name exists in the host identity catalog, such as a corporate directory (at operation 406). If the host does not exist, optionally, the user is allowed to retry entry of a host name (not shown); however, if the user is unable to provide a correct host name that corresponds to an authorized user in the host identity catalog, operation branches "no" and a message is sent to a help desk of the facility. The help desk of the facility may be an offsite desk that can call the user to assist with identifying an authorized user, while not requiring help desk personnel to be at the facility.

If the user provides a name of an authorized user that exists in the host identity catalog, operation branches "yes", and proceeds with capturing user information from the visiting user (step 408). Specifically, the web server will provide a plurality of user information screens, in response to which a user at the web browser capable device 12 can provide such user information. As illustrated in the screens of FIGS. 6-11, the user information can include, for example, a visiting user's name, a photograph of the visiting user (e.g., as captured at the web browser capable device 12, and a signature of the visiting user.

In the embodiment shown, a preview of the visitor's access card will be generated and provided via a web interface (step 410), for example, based on the information received from the user and generated according to a badge template 106, as in FIGS. 1-2.

Figure 12:
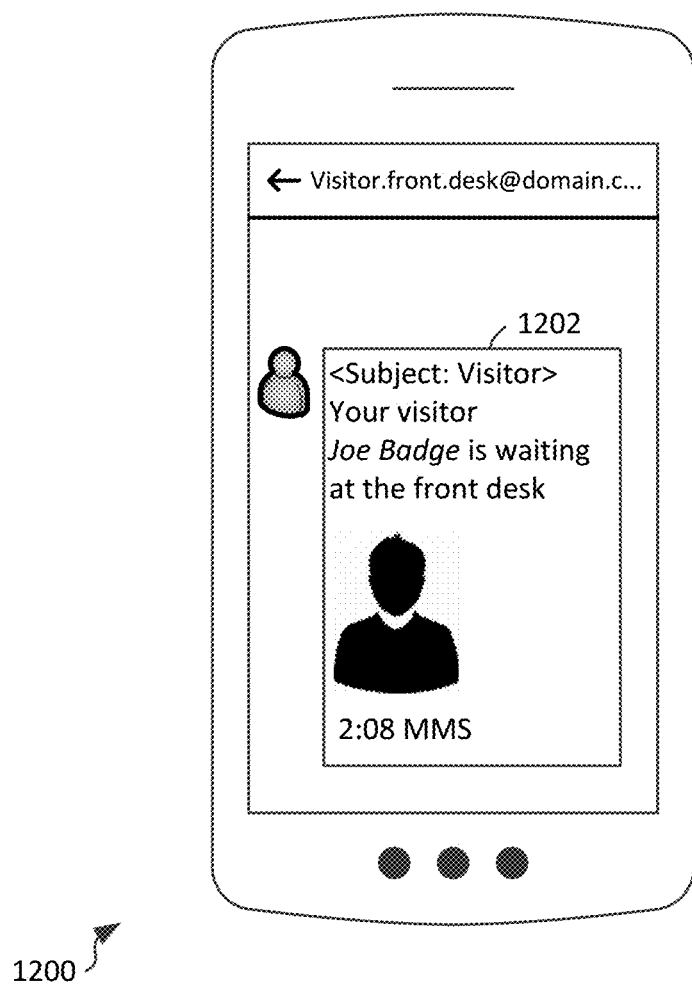
FIG. 12 illustrates a message transmitted to the authorized individual in conjunction with issuance of an access card to a visitor, according to an example embodiment.

Additionally, printer 100 can then issue the credential 150 (e.g., by printing and, if necessary, programming the badge) (step 412), and transmitting a message to the authorized individual identified by host name (step 414). As seen in FIG. 12 below, the message to the authorized individual can include a name, time, and image of the visitor user for review/approval by the authorized individual. Furthermore, at the time of badge issuance, the visitor can be logged, e.g., in visitor log 120 (step 416).

Referring to FIG. 4 generally, it is noted that certain steps may be reordered in various embodiments. For example, a visitor log entry may be made in the case of any attempted access of the facility, and in such cases, the log entry need not be made after issuance of a credential (e.g., prior to step 412). Furthermore, in some cases, no preview of the badge may be provided at all (at step 410). Still further, the visitor's user information may be captured prior to determining whether an authorized individual exists in the corporate directory; such an arrangement may assist a help desk in identifying the visitor (or assist the help desk in locating an authorized user associated with the visitor) by including the visitor's user information in the message to the help desk. In still further examples, the host could be sent a message at the time the web server 102 receives a host name (steps 402-404), rather than waiting for completion of issuance of the visitor badge.

Additionally, it is noted that the method of FIG. 4 can be initiated in a number of ways. Typically, the method 400 can be initiated by a web browser capable device 12 visiting a URL hosted by the web server 102 that presents a user interface for self-directed access card issuance. Visiting the URL results in the web browser capable device 12 issuing a request to the web browser for the user interface as described herein. The URL can be obtained at the web browser enabled device by, for example: the web browser capable device 12 joining a local wireless network and being redirected to the URL, a user typing in the URL (e.g., based on a sign posted at the facility), or by receipt of the URL via a short-range wireless communication protocol (e.g., via Bluetooth, NFC, or RFID connection to a memory associated with the printer 100 and storing the URL) or other visual capture means (e.g., via QR code).

FIG. 5 is a flowchart of a method 500 for capturing visitor information at a mobile device, for use by an access card issuance device, according to an example embodiment. The method 500 is generally performed at the web browser capable device 12 of FIGS. 1-2.

In the example embodiment shown, the method 500 includes displaying a user interface (step 502) at the web browser capable device 12, for receiving user information from a visitor user. In example embodiments, the user interface will be displayed in response to an HTTP GET request using the URL that is obtained and entered in a web browser that is preinstalled on the web browser capable device 12. As noted above, displaying the user interface can be performed in response to various ways in which the web browser capable device 12 may receive the URL of the user interface. Example user interface screens included in the user interface are provided below in conjunction with FIGS. 6-11. One initial screen 600 for the user interface is presented in FIG. 6; in that example, a welcome screen 600 is presented that includes a continue option 602, an employee credential reissuance option 604, and a card preview region. Additionally, navigation guidance, in the form of a highlighted sequence of screens (e.g., "start", "contact", "information", "picture", "signature", and "print") are provided to guide a user through a self-directed card issuance process, each of which represents different screens as discussed below.

Figure 7:
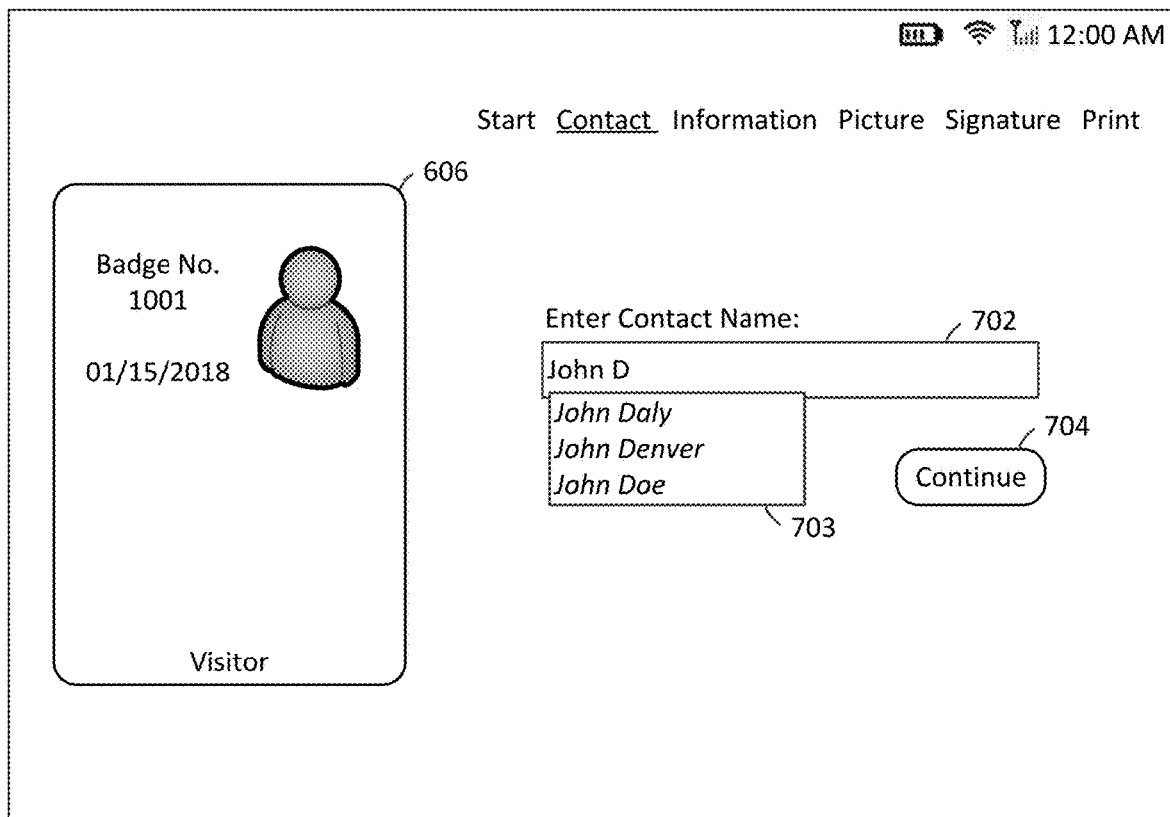
FIG. 7 illustrates the web interface of FIG. 6 including a host identification screen useable for capturing an identity of an authorized individual, according to an example embodiment.

The method 500 includes receiving, at a user interface, a host name of an authorized individual acting as a host of the visiting user, and transmitting the host name to the web server 102 (step 504). This can be performed using a host identification screen 700 of FIG. 7, which can be reached by selecting continue option 602 on screen 600 of FIG. 6. As seen in FIG. 7, a user lookup field 702 can be provided that allows a user to type a name of an authorized individual. In this case, an authorized individual "John Doe" is sought, and appears among a set of search results 703 that are obtained via querying a host identity catalog, such as is seen in FIGS. 1-2.

It is noted that in FIG. 7, because the continue option 602 was selected, the card preview region 606 begins to be populated with card information, including a "visitor" designation", as well as a date, and a badge number (e.g., assigned based on a next available badge number). This layout of the card can be based on the card template 106 of FIGS. 1-2.

Figure 8:
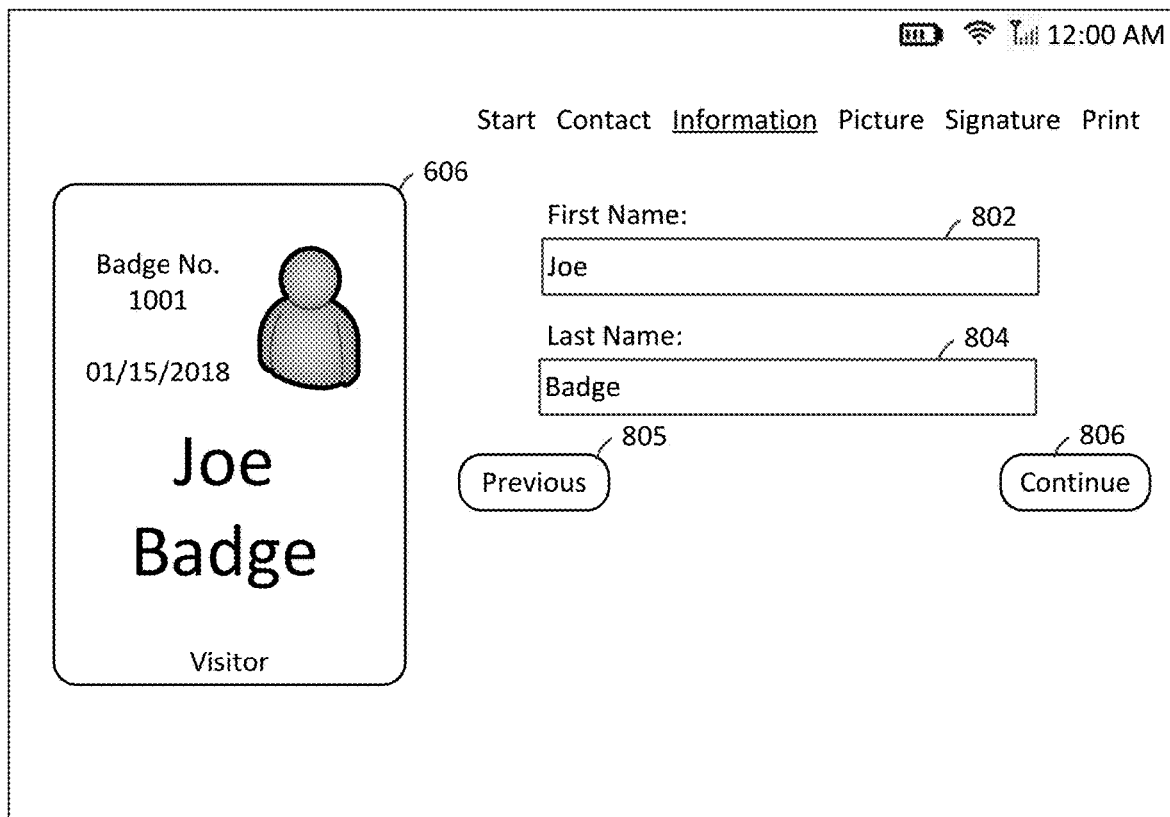
FIG. 8 illustrates the web interface of FIG. 6 including a user information entry screen, according to an example embodiment.

Continuing with FIG. 5, the method 500 includes receiving, at the user interface, a visitor name of the visiting user at the web browser capable device 12, and transmitting the visitor name to the web server 102 (step 506). This can be performed using a user information entry screen 800, such as is seen in FIG. 8. The user information entry screen can be reached by selecting the continue option 704 of screen 700 of FIG. 7. As illustrated in that screen, name entry fields 802, 804 are provided. As a user enters his or her name (in the example shown, "Joe Badge"), the name information populates into the card preview region 606 as well, alongside information previously included. Additionally, if the user wishes to start over or go back to a previous user information entry step, a previous screen option 805 is presented.

Figure 9:
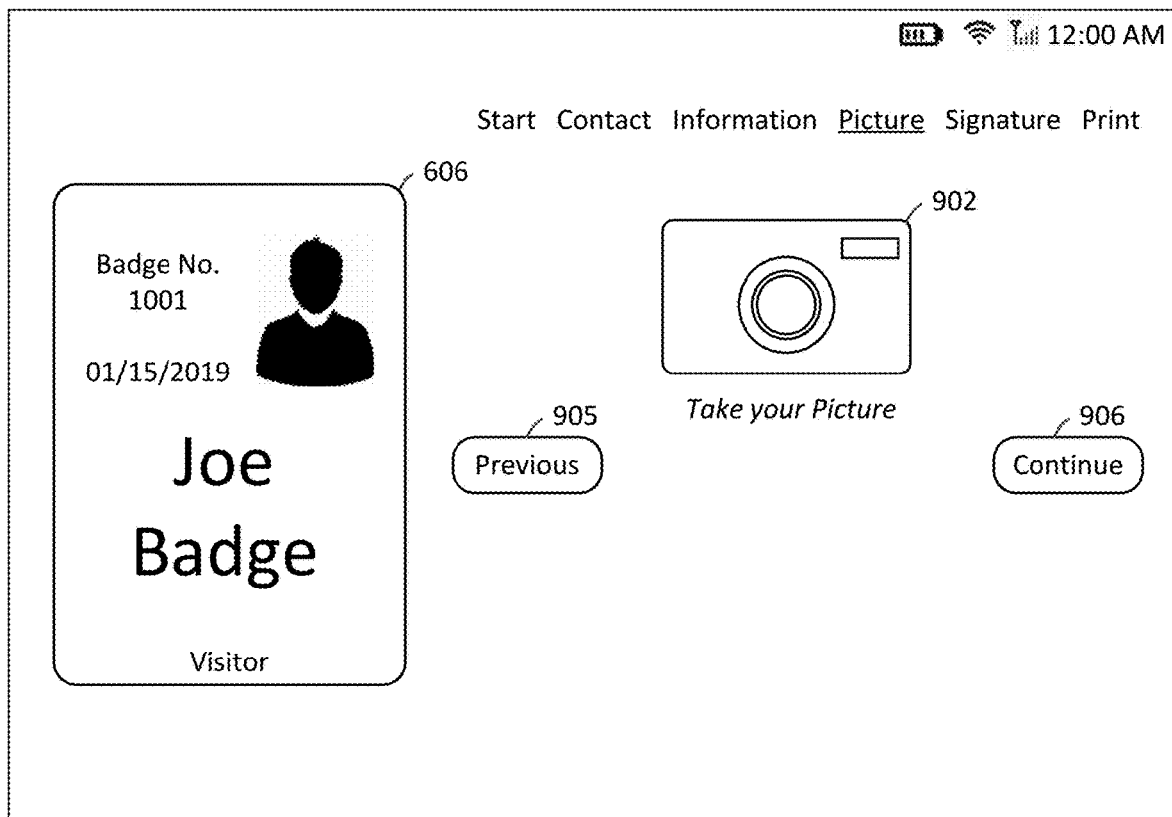
FIG. 9 illustrates the web interface of FIG. 6 including an image capture screen, according to an example embodiment.
Figure 10:
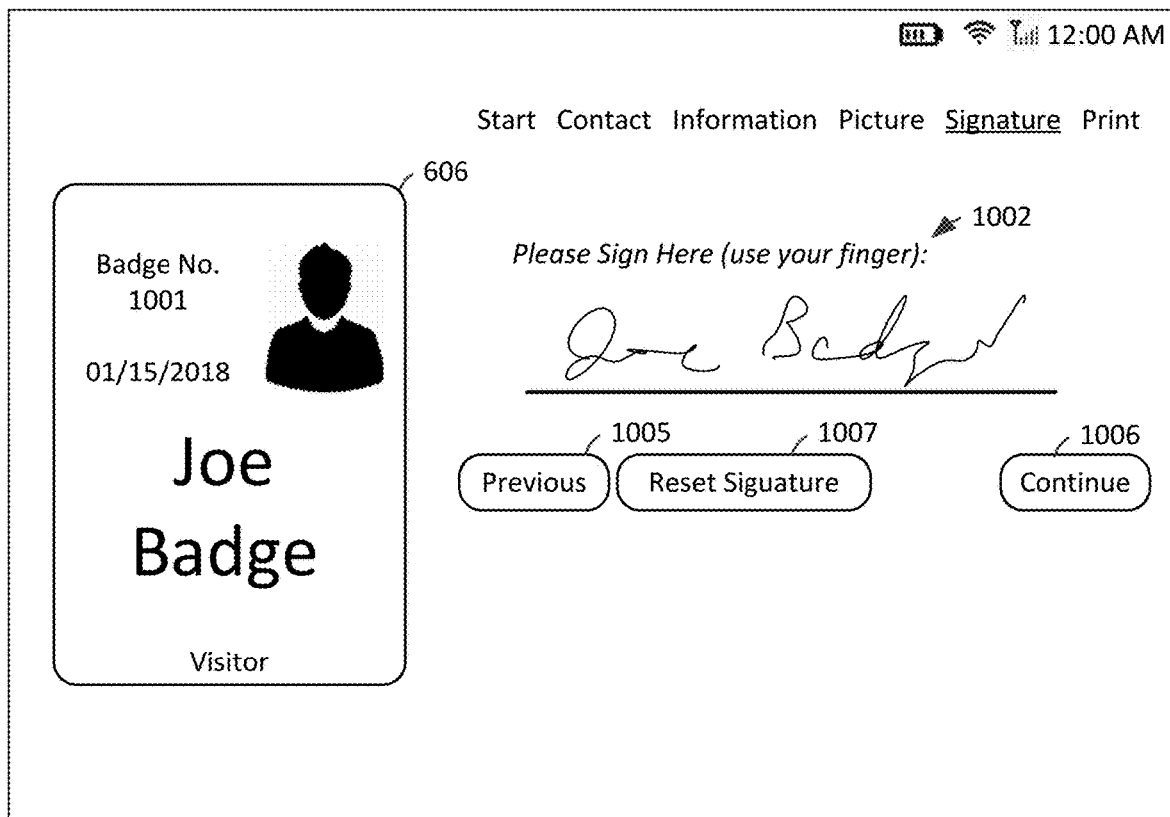
FIG. 10 illustrates the web interface of FIG. 6 including a signature screen, according to an example embodiment.
Figure 11:
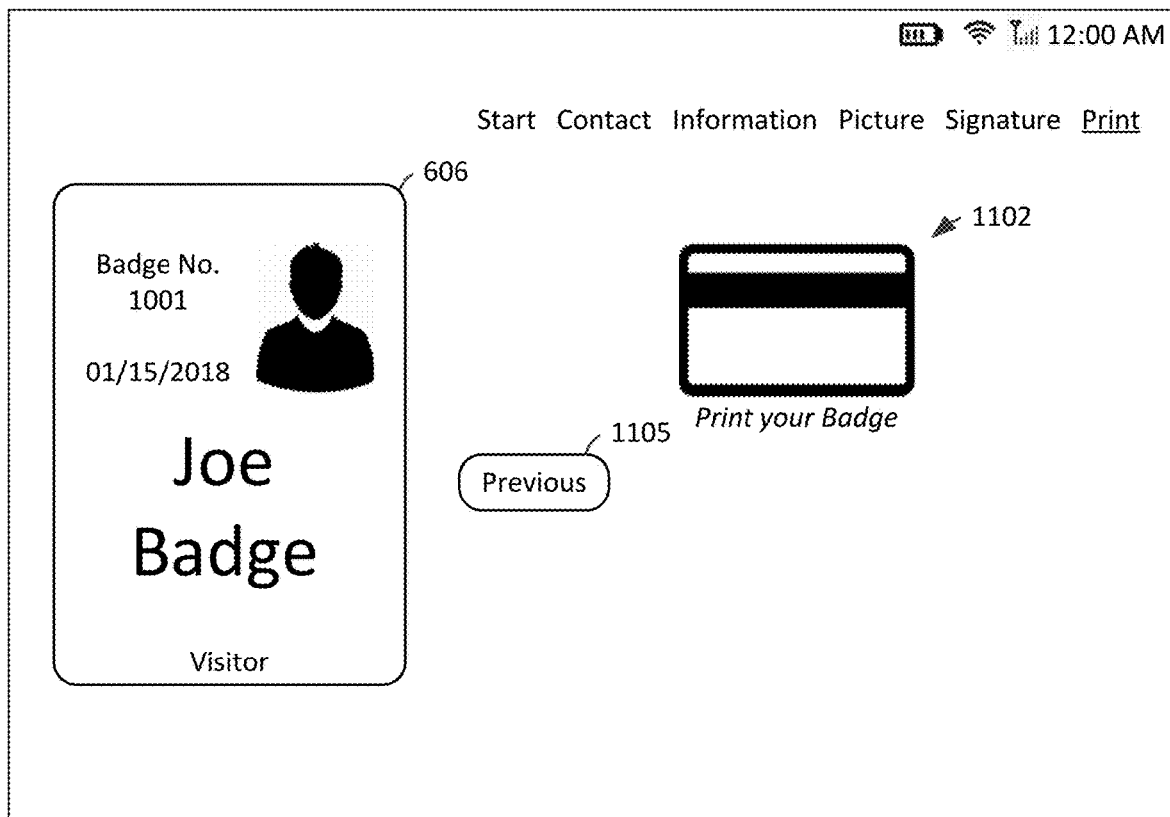
FIG. 11 illustrates the web interface of FIG. 6 including an access card issuance screen, according to an example embodiment.

Continuing with FIG. 5, the method 500 also includes receiving, at the user interface, a photograph of the visiting user, and transmitting the photograph to the web server 102 (step 508). This can be performed using an image capture screen 900 of the user interface, as seen in FIG. 9, which can be reached using the continue option 806 of the user information entry screen 800. The image capture screen includes an image capture region 902 which can be selected (e.g., via touch) by a user, which allows the user to take a photograph of him/herself using either a front- or rear-facing camera of the web browser capable device 12. The photograph can be presented in the card preview region 606. To retake the photograph, or return to previous steps, a previous screen option 905 is presented.

Continuing with FIG. 5, the method 500 also includes receiving, at the user interface, a signature of the visiting user, and transmitting the signature to the web server 102 (step 510). This can be performed using a signature screen 1000 of FIG. 10, in an example embodiment. The signature screen 1000 includes a signature region 1002 in which a user signature can be captured (signed with the visiting user's finger). A previous screen option 1005 allows the user to return to the image capture screen 900, while a reset signature option 1007 allows the user to reset the signature and re-sign. It is noted that in the embodiment shown, the signature captured in the signature region 1002 is not included in the card preview region 606, for example based on the signature not being among information to be included on a visitor access card in the card template 106 of FIGS.

1-2. However, in other embodiments, the signature could be included, or may be included on a reverse side of the card (not shown). Generally, although various types of user information can be collected using the user interfaces described herein, all or only some of that information may be printed on the access card (e.g., credential 150) or logged in the visitor log 120, in various embodiments. The types of information included on the access card is defined by the card template 106.

Continuing with FIG. 5, the method 500 also includes receiving, at the user interface, a print confirmation from the visiting user, and transmitting a print instruction to the web server 102 (step 512). This can be accomplished using a print confirmation screen 1100 of FIG. 11, which can be reached via the continue option 1006 of the signature screen 1000 of FIG. 10. The print confirmation screen 1100 presents, in the card preview region 606, the access card (e.g., credential 150) as it would be issued by the access card issuance device (e.g., printer 100). For example, upon selection of a print option 1102, the web server 102 in turn formulates card data based on the card template 106 and at least a portion of the user information captured via steps 506-510, and transmits that card data to the printing software component 104 of the printer 100 for issuing credential 150.

Referring back to FIG. 4, and with reference to FIG. 12, it is noted that, in association with printing the credential 150 at the printer 100, a message can be transmitted to the authorized individual (e.g., host) that the visiting user has arrived at the facility. This can occur before, during, or after printing of the credential, and can be based on contact information of the authorized individual as recorded in the corporate directory. One example of such a message is illustrated in FIG. 12, which is a schematic illustration of a user interface 200 of a host device 18. The schematic illustration shows a communication 1202 that can be sent to a host device 18, e.g., via mail server 16. In the example shown, a text message from an automated system (e.g., visitor.front.desk@domain.com) is received and includes a name of the visiting user, a photograph of the visiting user, and a specific time at which the message is sent. As such, an authorized user, acting as a host of the visiting user, can meet the visiting user at the facility entrance, or other predetermined location. Although a text message is illustrated, various other types of automated communications may be used as well. For example, an email could be sent including similar user information of the visiting user, or an automated voice message. In the case of an automated voice message, since a photograph cannot readily be transmitted to allow the authorized individual to validate the user, optionally, other user information could be captured (e.g., a short voice message recorded at the web browser capable device 12) that would be able to be captured and played back to the authorized individual for validation. Still other possibilities exist as well, consistent with the present disclosure.

Referring to FIGS. 4-5 generally, it is noted that the steps described in both Figures are largely able to be performed in any order, other than that the print instruction is typically executed only after adequate user information is received, and preferably performed after validation that a host name corresponds to an authorized individual (host) at the facility. However, the order in which various information is collected from a visitor user is largely arbitrary.

Figure 13:
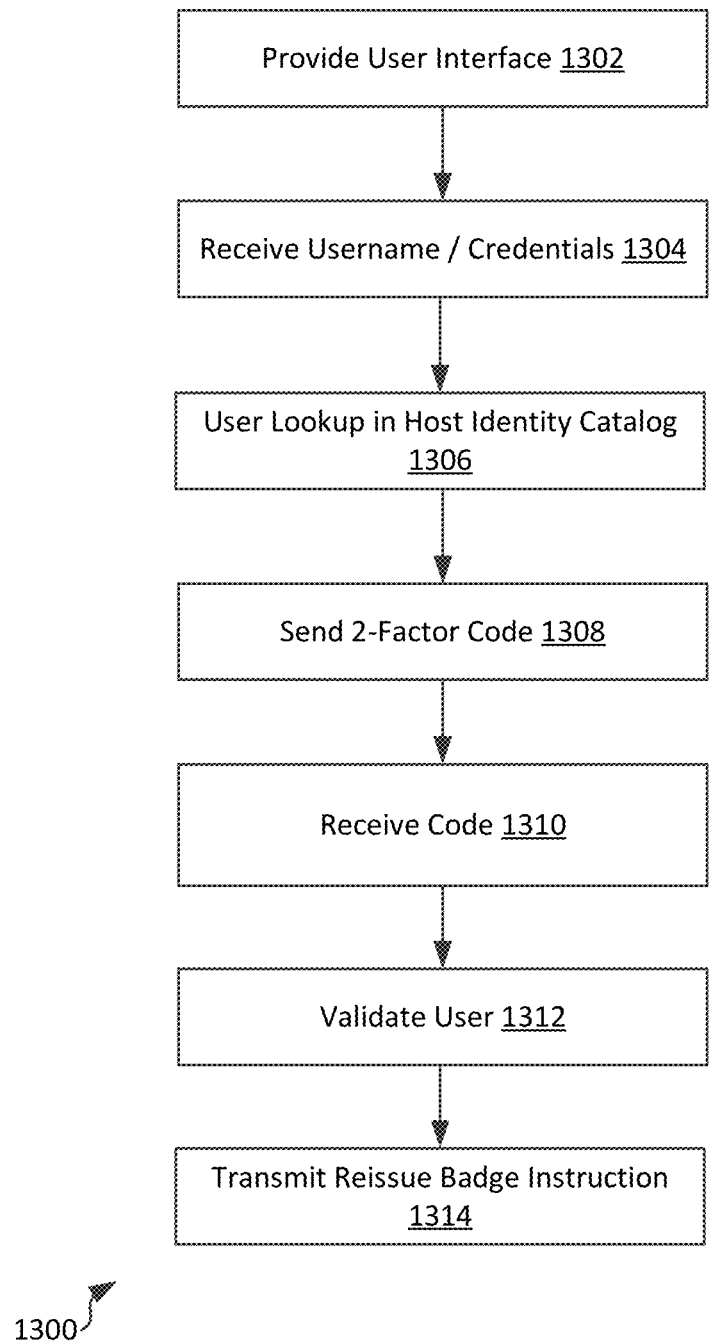
FIG. 13 is a flowchart of a method of issuance of an access card to an authorized individual, in accordance with an example embodiment of the present disclosures.

Referring now to FIGS. 13-17, a further use case of embodiments of the present disclosure is described, specifically for use in conjunction with reissuance of an access card (e.g., credential 150) for an authorized individual. FIG. 13 is a flowchart of a method 1300 of issuance of an access card to an authorized individual, in accordance with an example embodiment. The method 1300 includes providing a user interface (step 1302), which can include providing the user interface previously described, e.g., in FIG. 6. However, in conjunction with subsequent steps of FIG. 13, screens and messages generated by the web server can be generated in response to selection of the employee reissue option 604 of FIG. 6 at the web browser capable device 12.

In the embodiment shown, the method 1300 includes receiving, at the user interface, a username and credentials of the authorized individual, and transmitting the username and credentials to the web server 102 (step 1304). This can be accomplished by receiving username and credential (e.g., password) information associated with an authorized user in a user information entry screen 1400, such as that shown in FIG. 14. As seen in the user information entry screen 1400, username region 1402 and password region 1404 are included, as well as card preview region 1406. Since the user has not yet been validated, the card preview region 1406 remains generic, and may include some basic template elements as defined by the card template 106 (e.g., such as a location of an image of the authorized user and badge number, as shown). A continue option 1410 allows the authorized user to submit the username and password information entered in regions 1402, 1404, while a previous option 1408 returns the user to the welcome user interface 600 of FIG. 6.

In the embodiment shown, the method 1300 includes performing, at the web server 102, a lookup of the authorized user based on the username and credentials received at the web browser capable device 12 (step 1306). The lookup can occur in the host identity catalog 14, to validate that the user and credentials are correct.

Assuming the correct information is entered, in the embodiment shown, the method 1300 includes sending, from the web server to the web browser capable device 12 a two-factor authentication code for validation of the user (step 1308). The two-factor authentication code can be sent from the web server 102 via the mail server 16 based on contact information in the host identity catalog 14, e.g., via text message. The two-factor authentication code can be, for example a six-digit number transmitted to the user, which is received at the web browser capable device 12 (step 1310). An example of receipt of such an authentication code is illustrated in the message shown in FIG. 15. In that figure, a schematic view 1500 of a web browser capable device 12 receiving such an authentication code by text message 1502 is illustrated. The text code (in this case "123456") is provided to the user for entry into the user interface, e.g., in the validation screen 1600 of FIG. 16. In the validation screen 1600, a validation region 1602 is provided for entering the validation code, to ensure that the authorized user is in fact the user seeking to reissue his/her access card. The validation screen 1600 is reached in response to the user entering a valid username and password, and therefore includes, in the card preview region 1406, a representation of the authorized individual's access card to be printed, including a previously-stored name, photograph, badge number and optionally other user information that may be in the host identity catalog 14.

Figure 17:
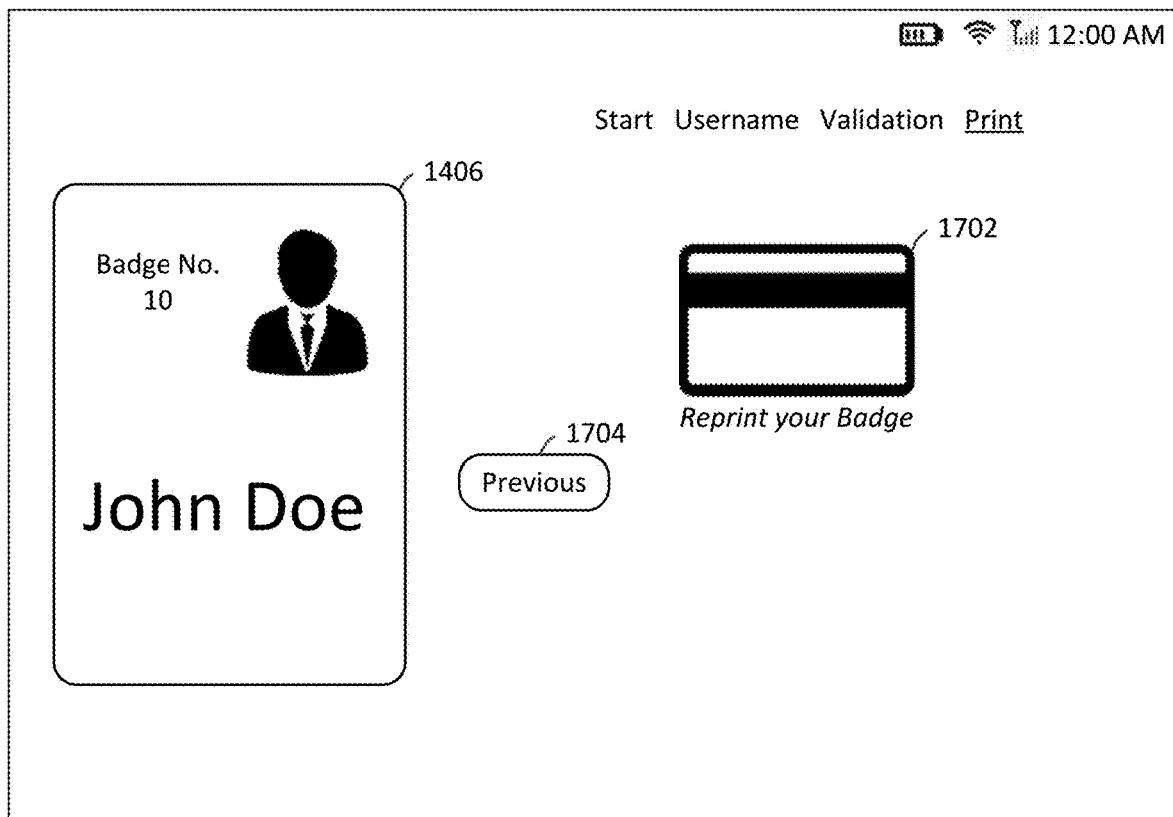
FIG. 17 illustrates the web interface of FIG. 14 including an access card issuance screen, according to an example embodiment.

Upon entry of the validation code and selection of a continue option 1606 of the validation screen 1600 the web server 102 could validate the user by matching the transmitted and received validation codes (step 1312). Upon validating the user, the web server could present the user with a badge issuance screen 1700 as seen in FIG. 17. Selection of the badge issuance option 1702 would result in transmission of a badge reissue instruction from the web browser capable device 12 to the web server 102 which would then be relayed to the printing software component 104 of the printer 100 for issuance of a credential 150 (e.g., a reissued access card). If any changes to the badge were required, the user could select a previous option 1704 on the badge issuance screen 1700 to return to prior screens as needed.

Figure 14:
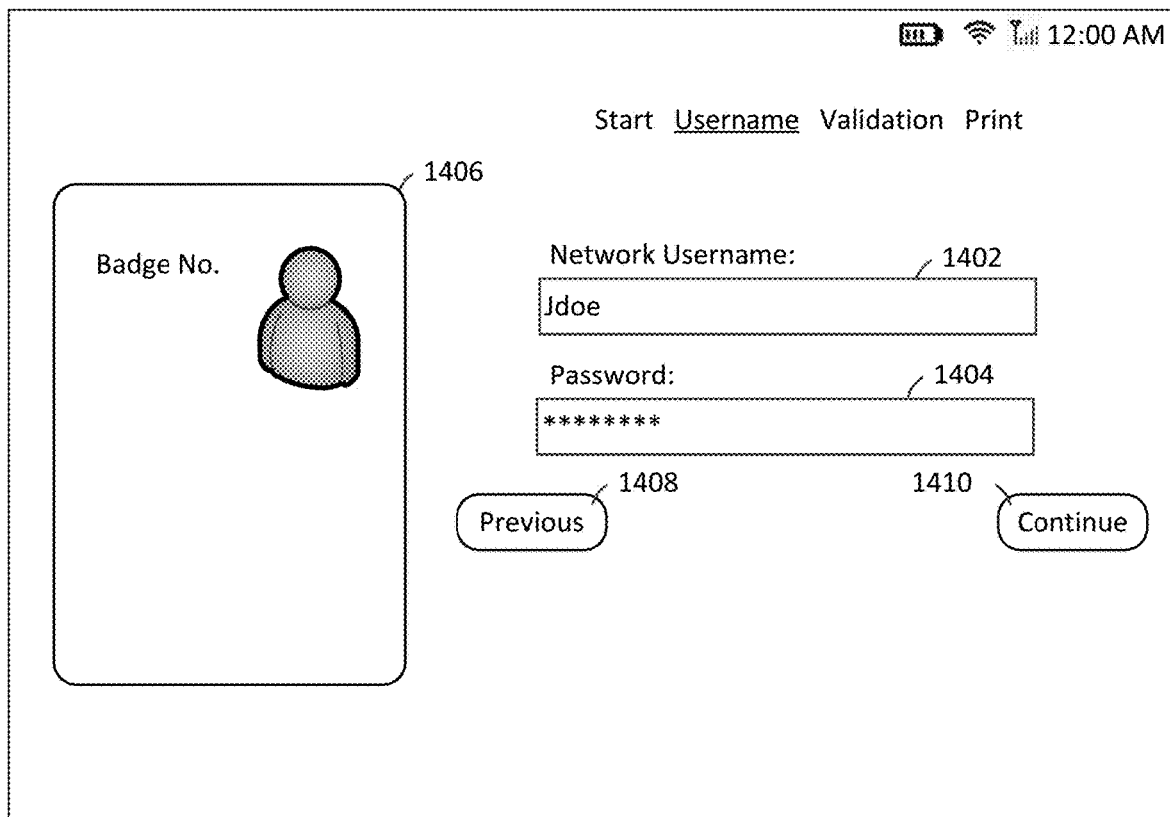
FIG. 14 is a web interface useable by an authorized individual to provide user information to an access card issuance device, according to an example embodiment.
Figure 15:
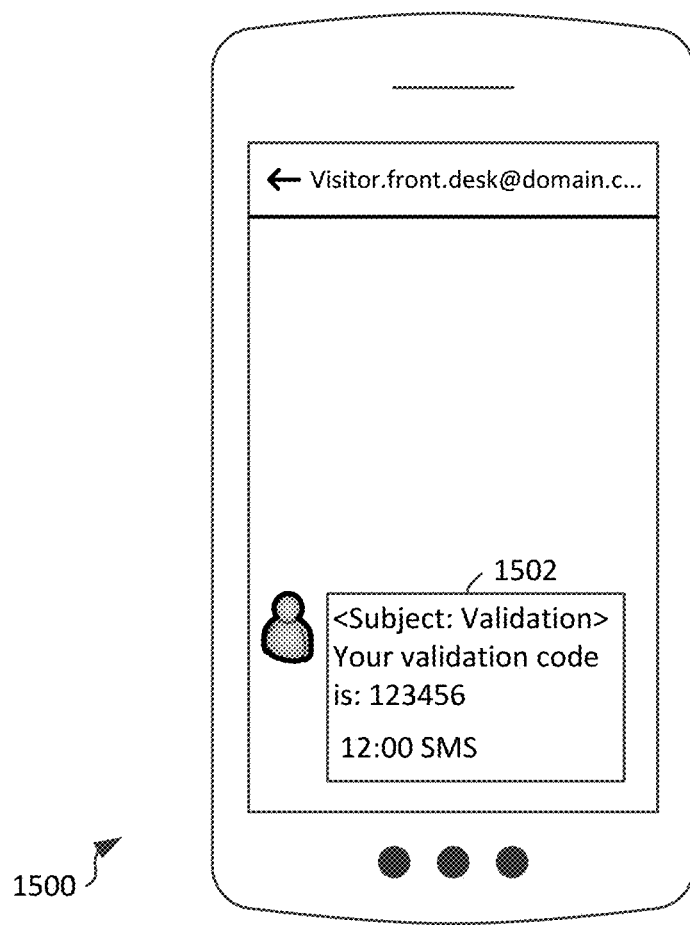
FIG. 15 illustrates a message transmitted to the authorized individual in conjunction with issuance of an access card to that authorized individual, according to an example embodiment.
Figure 16:
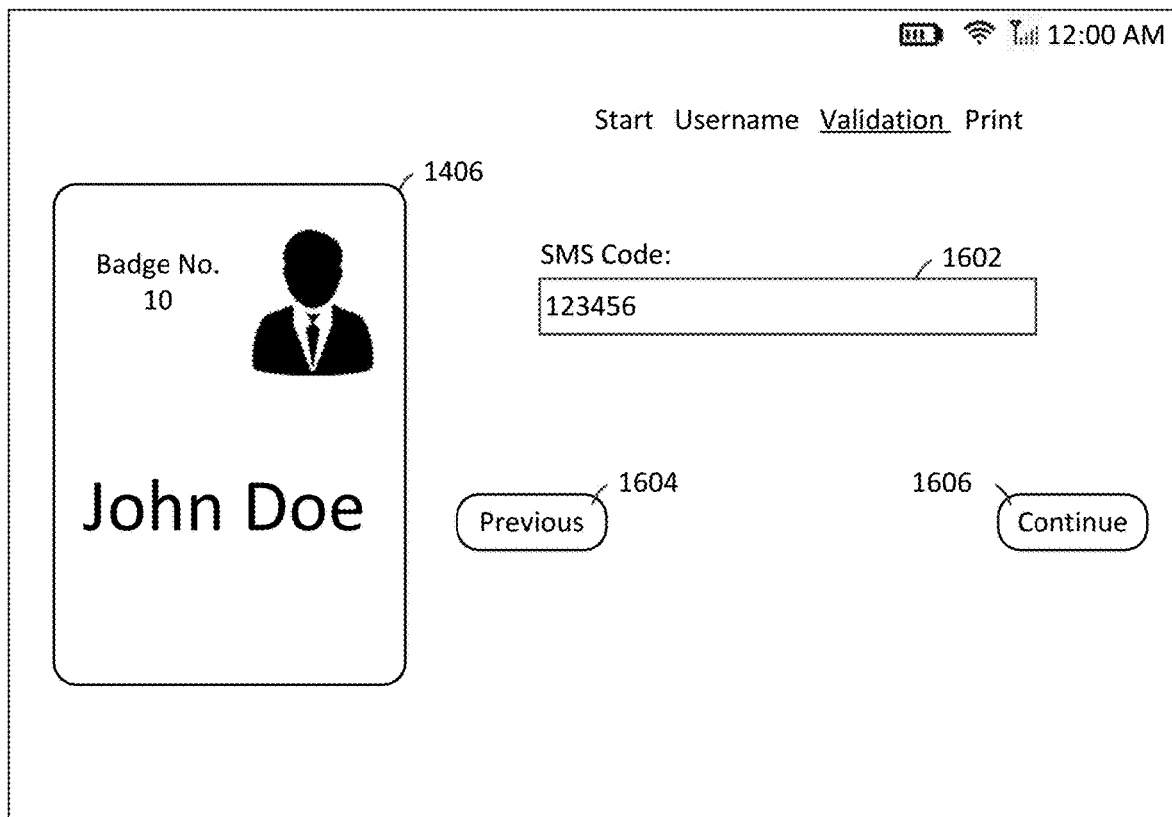
FIG. 16 illustrates the web interface of FIG. 14 including a validation screen, according to an example embodiment.

It is noted that if the correct username and password information is not entered in the screen 1400 of FIG. 14, the user will not receive a text message, since no such user would be found in the host identity catalog 14. Accordingly, such a user could not enter a code in the validation screen 1600 of FIG. 16, and therefore could not proceed successfully to reissue a credential 150. Such an unauthorized user could not proceed via the continue option 1606 of FIG. 16, and would either select the previous option 1604 to return to screen 1400 to log in as a different user, or would otherwise be prevented from proceeding. Optionally, after a predetermined number of attempts (one or more) such access attempts could be logged either in the visitor log 120 or communicated to a remote system administrator or security desk for attention.

Referring to FIG. 13 generally, it is noted that, as with FIGS. 4-5 above, the various user information gathering processes may be performed in a different order consistent with the present disclosure. Furthermore, additional operations may be included as well, not depicted above. For example, if an authorized individual is reissued a new access card, one or more operations may be performed to invalidate that individual's previous badge, to prevent access to the facility by an unauthorized possessor of that lost/stolen badge.

Referring to FIGS. 1-17 generally, and in particular to the access card issuance devices and methods described herein, there are a number of advantages over existing systems apparent from the present disclosure. In particular, self-directed access card (e.g., credential) issuance allows users to print access cards without requiring dedicated security personnel at a facility, which may be particularly useful at remote or rarely-visited facilities. Still further, in such situations, visitors do not wish to install specialized software on personal mobile devices, and therefore the present disclosure provides a web-enabled method by which badges can be reissued by leveraging capabilities of typical mobile devices (e.g., cameras and touch screens for signature capture) while avoiding a requirement of such specialized software.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. An access card printer comprising:
a card printing subsystem;
a processing unit;
a memory communicatively connected to the processing unit, the memory storing instructions executable by the processing unit including a card printing application wherein the instructions, when executed, cause the access card printer to perform, in response to a request from a mobile device:
provide a web interface to the mobile device;
receive, via the web interface, user information identifying a user of the mobile device and an identity of an authorized individual associated with a facility, the authorized individual being an individual other than the user of the mobile device;
issue an access card to the user of the mobile device, the access card having indicia printed thereon by the card printing subsystem identifying the user; and
transmit, to the authorized individual, a message associated with issuance of the access card.

2. The access card printer of claim 1, wherein the access card includes information encoded thereon providing access rights to the facility.

3. The access card printer of claim 1, wherein the indicia printed on the access card includes at least one of a user name, a picture, a signature, a duration of validity of the badge; or an access level associated with the badge.

4. The access card printer of claim 1, wherein the instructions further cause the access card printer to validate the identity of the authorized individual associated with the facility.

5. The access card printer of claim 1, wherein the memory stores instructions including a web server application configured to provide the web interface to the mobile device.

6. The access card printer of claim 1, wherein the memory further stores at least one access card template, the access card template defining a layout of the indicia printed on the access card.

7. The access card printer of claim 1, wherein the web interface comprises a plurality of user entry screens, the plurality of user entry screens including a signature screen, an image capture screen, and a host identification screen.

8. The access card printer of claim 1, wherein the memory further stores a visitor log including user information for a plurality of visitors, and wherein the access card issuance device is further programmed to, based on issuance of the access card to the user, store the user information associated with the user in the visitor log.

9. The access card printer of claim 1, wherein the access card issuance device is configured to provide the web interface to the mobile device in response to the mobile device registering on a wireless network at the facility.

10. The access card printer of claim 1, wherein the access card issuance device is configured to provide the web interface to the mobile device in response to a request from the mobile device received at the access card issuance device.

11. The access card printer of claim 1, wherein the user is a visitor of the authorized individual, and the message to the authorized individual notifies the authorized individual of the presence of the user at the facility.

12. The access card printer of claim 1, wherein the access card printer is located at the facility, the facility being managed by an organization of the authorized individual.

13. The access card printer of claim 1, wherein the user information includes at least one of a signature of the user or an image of the user.

14. A method of issuing an access card at a facility, comprising:
providing a web interface to a mobile device;
receiving, via the web interface, user information identifying a user of the mobile device and including an identity of an authorized individual associated with the facility, the authorized individual being an individual other than the user of the mobile device;

issuing, at an access card issuance device, an access card to the user of the mobile device, including printing indicia on the access card including at least a portion of the user information; and transmitting, from the access card issuance device to the authorized individual, a message associated with issuance of the access card.

15. The method of claim 14, wherein the user comprises a visitor, the method further comprising:

receiving from the mobile device an identification of a host individual; and performing a lookup at a host identity catalog to verify the identification of the host individual;

wherein providing an information gathering user interface to the mobile device is based on verification of the identity of the host individual.

16. The method of claim 15, wherein the message associated with issuance of the access card comprises a message to the host individual indicating the presence of the visitor at the facility.

17. The method of claim 16, wherein transmitting the message is performed using contact information of the host individual that is included in the host identity catalog.

18. The method of claim 17, wherein the message comprises one of a text message, an email, or an automated voice message.

19. The method of claim 14, wherein providing the web interface is performed in response to the mobile device registering on a wireless network at the facility.

20. The method of claim 14, wherein the user information includes a signature of the user and an image of the user.

21. An access card issuance system comprising an access card issuance device located at a facility of an organization and a web server, wherein the access card issuance system is configured to:

provide a web interface from the web server to a mobile device in response to a request from the mobile device;

receive, via the web interface, user information identifying a user of the mobile device, the user information including an identity of an authorized individual associated with a facility, the authorized individual being an individual other than the user of the mobile device;

issue an access card to the user of the mobile device from the access card issuance device, the access card having indicia printed thereon identifying at least a portion of the user information; and transmit, to the authorized individual, a message associated with issuance of the access card.

22. The access card issuance system of claim 21, wherein the web server is communicatively connected to and separate from the access card issuance device.

23. The access card issuance system of claim 21, wherein the access card issuance system is further configured to perform a lookup at a host identity catalog to verify the identification of the authorized individual, the host identity catalog comprises at least one of a corporate directory or an identity provider.

24. The access card issuance system of claim 23, wherein the corporate directory comprises an Active Directory server communicatively connected to the access card issuance device.

* * * * *